United States Patent [19]

Gumm et al.

[11] Patent Number: 5,073,822
[45] Date of Patent: Dec. 17, 1991

[54] IN-SERVICE CABLE TELEVISION MEASUREMENTS

[75] Inventors: Linley F. Gumm; William Benedict, both of Beaverton, Oreg.

[73] Assignee: Tektronix, Inc., Beaverton, Oreg.

[21] Appl. No.: 615,119

[22] Filed: Nov. 19, 1990

[51] Int. Cl.$^5$ .................. H04N 17/00; H04N 7/10; H04N 7/04

[52] U.S. Cl. .................. 358/139; 358/86; 358/21 V; 358/145

[58] Field of Search .............. 358/139, 86, 21 V, 145; 455/3

[56] References Cited

U.S. PATENT DOCUMENTS

| | | | |
|---|---|---|---|
| 3,469,190 | 9/1969 | Rheinfield | 358/139 |
| 3,651,403 | 3/1972 | Fluck, Jr. | 358/139 |
| 4,023,104 | 5/1977 | Rheinfield | 358/139 |
| 4,207,431 | 6/1980 | McVoy | 358/139 |
| 4,408,227 | 10/1983 | Bradley | 358/139 |
| 4,700,222 | 10/1987 | Large et al. | 358/86 |

*Primary Examiner*—John K. Peng

*Attorney, Agent, or Firm*—Francis I. Gray

[57] ABSTRACT

A cable television measurement system uses a modified spectrum analyzer for determining both carrier-to-noise and triple beat ratios for a cable television (CATV) system. The modified spectrum analyzer is triggered for single sweep during the vertical interval of a selected channel, and the noise amplitude, peak sync tip amplitude and frequency of the channel are determined. The carrier-to-noise ratio is determined from the noise amplitude and the peak sync tip amplitude and the ratio and frequency are displayed. For triple beat ratio measurements a headend unit coupled between a television signal source and a combiner in the CATV headend prior to distribution offsets a selected channel by a predetermined frequency for a specified number of lines in the vertical interval. The modified spectrum analyzer measures the peak sync tip amplitude and a triple beat amplitude at the end of the specified number of lines. The triple beat ratio is determined from the triple beat amplitude and the peak sync tip amplitude and displayed.

12 Claims, 7 Drawing Sheets

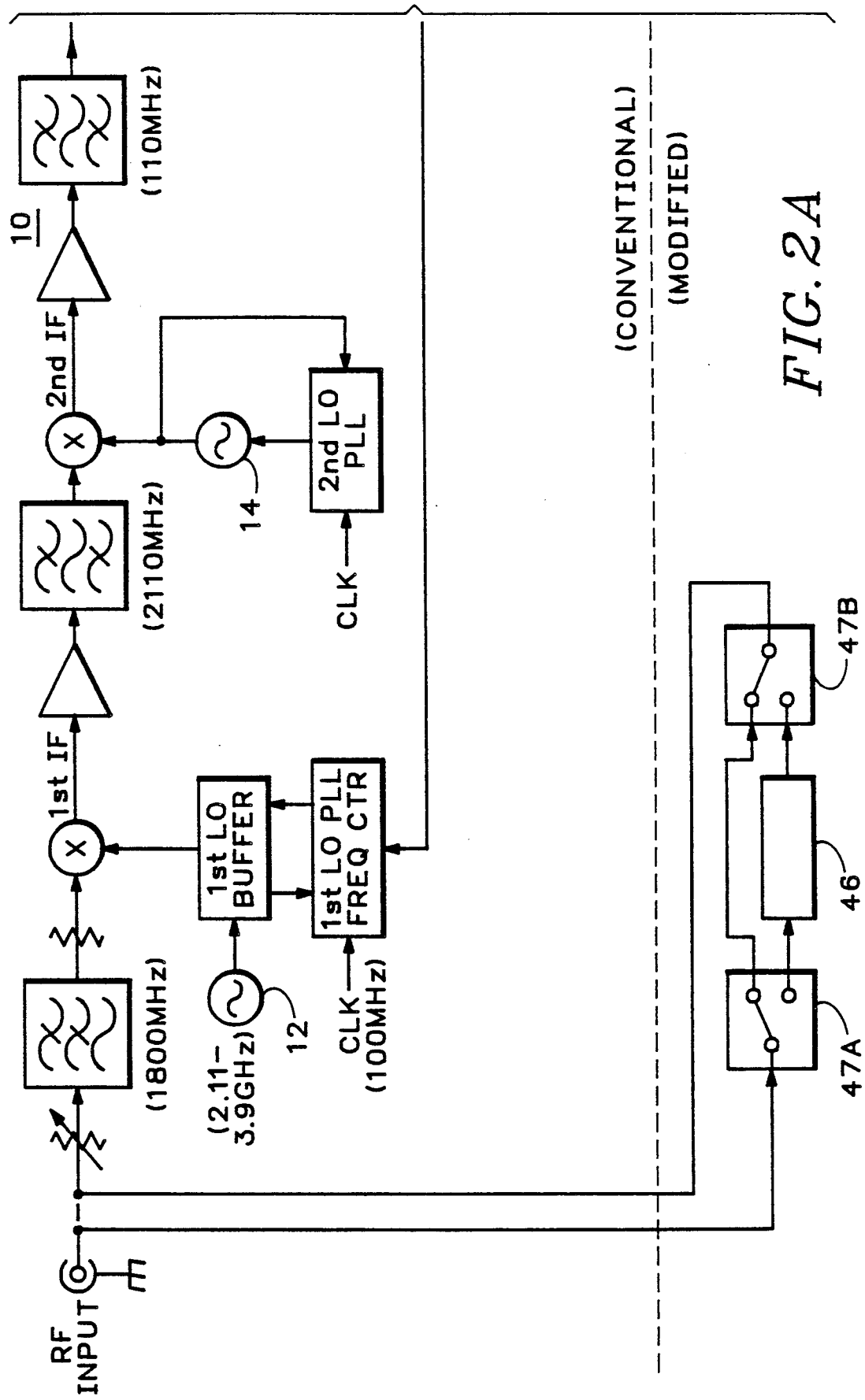

IN-SERVICE CABLE TELEVISION MEASUREMENTS

BACKGROUND OF THE INVENTION

The present invention relates to cable television measurements, and more particularly to in-service cable television measurements of composite triple beat and carrier-to-noise ratios that present no disruption to a viewer of the channel being measured.

Cable television (CATV) systems may be broken down into two major blocks: a headend and a distribution system. The headend is where the television signals are acquired and prepared to be routed to a customer or viewer, and the distribution system carries the prepared signals to the customer's receiver. The signals are sent in a frequency domain multiplexed analog format over a coaxial cable, i.e., each signal is converted to a unique frequency for transmission, using the same transmissions standards as used in broadcast television. To receive a given signal on the cable, the customer tunes the receiver to the signal frequency the same as for a broadcast signal.

The signals in the coaxial cable have to be amplified approximately every two thousand feet or so along the cable to make up for the cable's attenuation or loss. CATV amplifiers are very carefully designed to have low distortion and noise. However every amplifier adds a little extra noise and distortion to the signal the cable carries. The effect of the distortion is to generate new signals, called intermodulation products. These products are called "beats" in the CATV industry. One of the most troublesome of these beats is caused by mixing together three different signals, and is called "triple beats."

Since the picture carrier frequencies are the largest signals in the CATV system and since most of the picture carrier frequencies are on a regular six megahertz spacing, the majority of the triple beat products fall very close to the picture carrier frequencies. In a five hundred megahertz system well over one thousand beats occur near each midband picture carrier frequency. Because there are so many beats, no attempt is made to measure them individually. Instead the total of all the beats, or their composite, is measured.

To minimize the effects of noise, the amplitude of the signals in the system should be maximized. However large signal amplitudes cause the amplitude of the triple beats to increase sharply which makes the television signal muddy. To minimize the effects of triple beats the amplitude of the signals should be minimized, lowering the amplitude of the signals with respect to the noise, making the television signals snowy. To get good performance from a CATV distribution system the amplitude needs to be carefully adjusted to balance distortion and noise.

Previous methods for measuring either noise or distortion require interrupting the service on at least one CATV channel. Due to customer complaints about such loss of service, CATV system operators are reluctant to make these measurements routinely. To minimize these complaints tests are made early in the morning, increasing costs. Two people are required to perform either test: one at the headend to remove the signal and the other in the field to make the actual measurement.

What is desired is a more cost effective method of making these cable television measurements without disrupting service to the customer.

SUMMARY OF THE INVENTION

Accordingly the present invention provides an in-service cable television measurement method for composite triple beat and carrier-to-noise ratios that requires only a single operator to operate during normal working hours without affecting customer quality in any appreciable way. A frequency domain measurement instrument, such as a specially modified spectrum analyzer, is used to make the measurement in the field while a headend unit is permanently installed between a television source and a combiner that make up the headend of a cable television system. The headend unit removes the modulation from the picture carrier frequency for the channel being measured and the frequency is shifted, typically lower, during the measurement period. This removes the spectral clutter in the area of the picture carrier frequency so that the triple beat measurement may be made. The exact phase relationship between the picture and sound carrier frequencies is maintained to avoid a very loud buzz which would be caused by moving the picture carrier frequency. A measurement display system is triggered during the vertical interval of a television input signal, and the signal is sampled for a limited number of lines during the vertical interval to provide ensemble averaging.

Carrier-to-noise ratio is measured by ensemble averaging the noise between sync edges without the necessity of removing or moving the picture carrier frequency. The averaged values for both measurements are compared with the sync-tip peak amplitude for the input signal and appropriately displayed.

The objects, advantages and other novel features of the present invention are apparent from the following detailed description when read in conjunction with the appended claims and attached drawing.

BRIEF DESCRIPTION OF THE DRAWING

FIGS. 2A and 2B are block diagrams of a spectrum analyzer as modified to provide in-service CATV measurements according to the present invention.

DESCRIPTION OF THE PREFERRED EMBODIMENT

Figure 1:
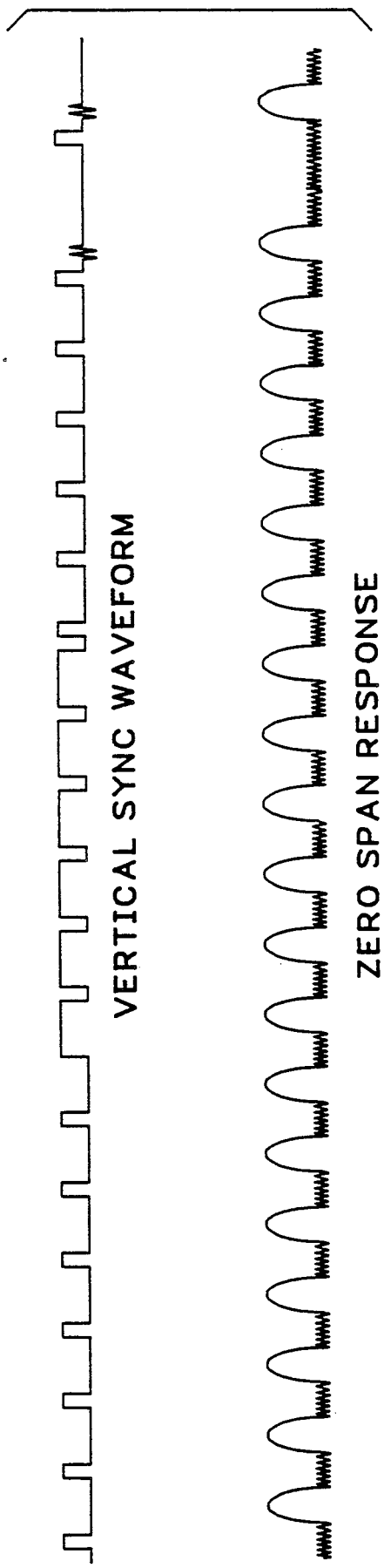
FIG. 1 is a waveform representation of a television horizontal interval and a corresponding zero span response of a conventional spectrum analyzer as modified according to the present invention.

In-service carrier-to-noise tests are a radio frequency (RF) analog to the method used to make in-service video signal-to-noise tests. The amount of video noise is measured in the vertical interval where there are only blank lines of video information. To perform such a test in the RF domain a spectrum analyzer is tuned in zero span to a frequency midway between the picture and sound carrier frequencies. The spectrum analyzer's timebase is synchronized with the video signal so that it sweeps only during the vertical interval of the video signal. The spectrum analyzer still responds to each edge of the television signal's sync signal, but between these events the analyzer displays the system's noise amplitude as shown in FIG. 1.

Figure 2B:
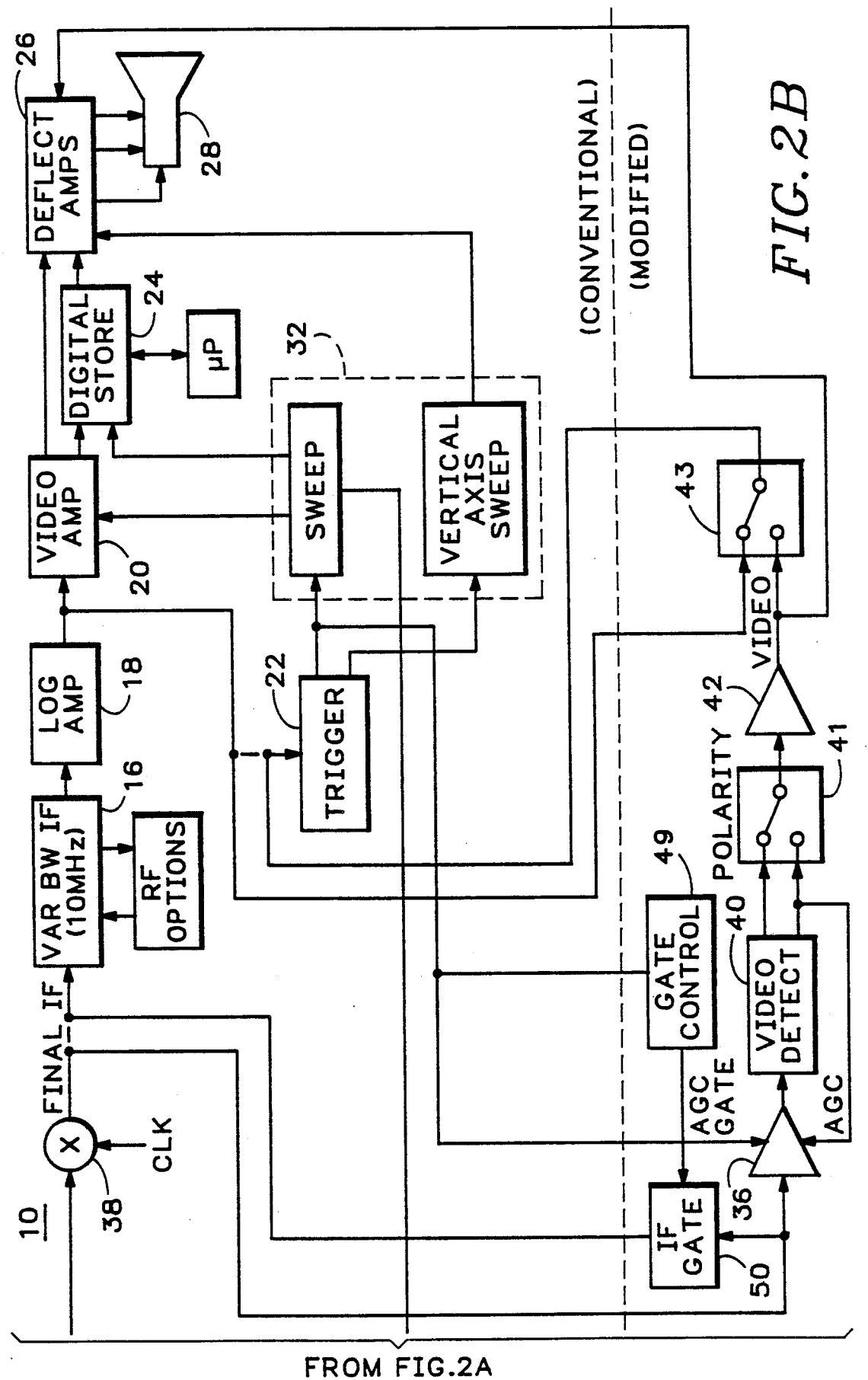

Referring now to FIG. 2 additional hardware is added to a conventional spectrum analyzer 10, such as the 2710 Spectrum Analyzer manufactured by Tektronix, Inc. of Beaverton, Oreg., USA, to make the necessary measurements. In the spectrum analyzer 10 an RF input signal is attenuated, filtered and mixed with a swept local oscillator 12 to beat the frequency of the input signal up to a first intermediate frequency. The first intermediate frequency is then beat down by a second fixed frequency local oscillator 14 to produce a second intermediate frequency. The second intermediate frequency is mixed with the system clock signal CLK to produce a final intermediate frequency signal for processing.

The final intermediate frequency signal is input to a variable bandwidth IF amplifier stage 16 and then to a logarithmic amplifier 18. The output of the log amp 18 is input to both a video amplifier 20 and a trigger circuit 22. The output of the video amplifier 20 is either stored in a digital storage device 24 or output to a deflection amplifier 26 for display on a cathode ray tube (CRT) 28 or other suitable display device. The trigger circuit output is input to a sweep and vertical axis sweep circuit 32 to generate the necessary sweep signals for displaying the video signal, either from the video amplifier 20 or from the digital storage device 24.

Since the spectrum analyzer 10 is tuned to a frequency above the picture carrier frequency in zero span, a sync separator circuit in the sweep circuit 32 does not work correctly without additional circuitry. This can be seen by noting in FIG. 1 that the output waveform for the zero span response does not look like the vertical sync signal. The additional hardware includes an IF amplifier 36 coupled to the output of the last mixer stage 38, a video detector 40 coupled to the output of the IF amplifier, and a video amplifier 42 coupled to the output of the video detector. The output of the video amplifier 42, the polarity of which is determined by a switch 41, is coupled to the television sync separator in the trigger circuit 22 via switch 43 and to the deflection amplifier 26. This allows triggering of the display sweep signals during the vertical interval to obtain the results shown in FIG. 1. At this point in the system the picture carrier frequency is at 12.5 MHz when the spectrum analyzer 10 is correctly tuned to the television signal in zero span.

Figure 3:
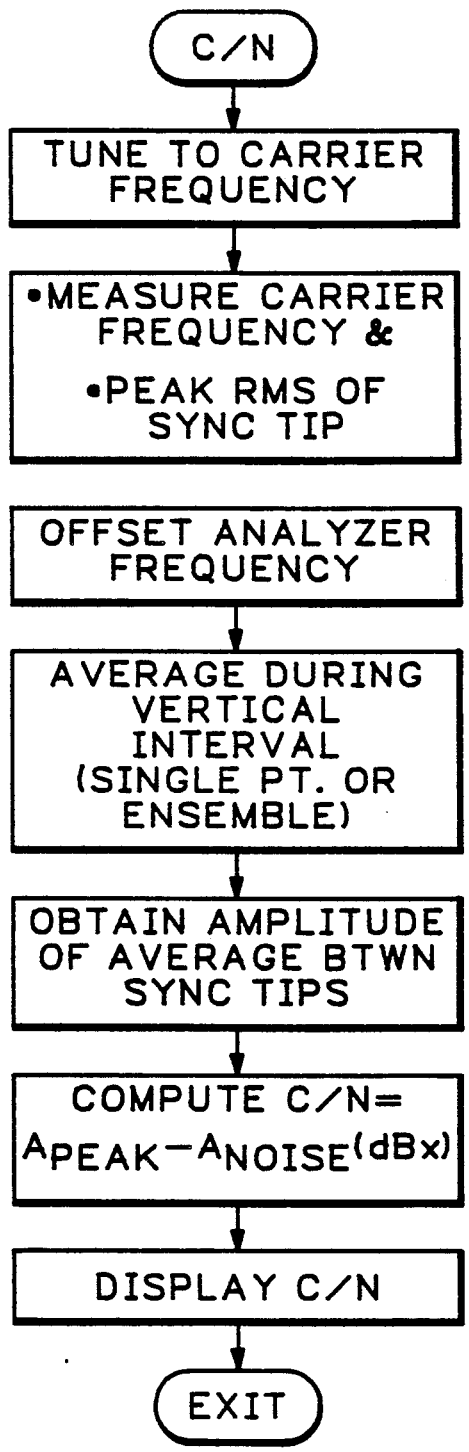
FIG. 3 is a flow chart of the method of measuring carrier-to-noise ratio according to the present invention.

The method of actually measuring the amplitude of the noise uses an averaging technique to achieve a value that has a small variance from measurement to measurement. The noise power is sampled each sweep during the vertical interval until enough samples are taken to achieve a stable value. This requires setting the spectrum analyzer 10 in a specific configuration as set forth below. In operation an operator places an active marker on the picture carrier frequency of the signal to be measured and enables the carrier-to-noise routine shown in FIG. 3. The spectrum analyzer 10 measures the peak rms amplitude of that carrier's sync tip and the carrier's frequency. The routine sets up the spectrum analyzer for zero span response with the frequency adjusted for 3 MHz above the picture carrier frequency. The acquisition mode for sample averaging also is selected and a television line number is selected to bring the vertical interval to mid screen of the display. Successive samples from either the same horizontal location, i.e., single point averaging, or over an entire sweep, i.e., ensemble averaging, are taken and averaged over a series of sweeps until a stable value(s) is obtained. A search algorithm identifies two of the impulses from the vertical sync pulses and either takes an averaged sample from the display midway between them or initially identifies the single point that is to be averaged. After the acquisition stops, the amplitude halfway between the impulses as determined by the search algorithm is taken to be the noise amplitude, corrected for the spectrum analyzer's noise floor. The C/N ratio is calculated as being the difference in dB between the sync's peak absolute amplitude in dBm and the measured noise amplitude. The C/N ratio is displayed alphanumerically on the CRT or other display device and the spectrum analyzer returns to the settings previously selected before the C/N routine was selected.

Composite triple-beat is more difficult to measure than carrier to noise. When measured manually the rms sync tip amplitude is first measured, typically in a 300 kHz resolution bandwidth. Then the carrier is removed and the residual signal is measured in a 30 kHz bandwidth. The residual signal is very noise-like.

For automatic measurement some additional hardware is added to the conventional spectrum analyzer 10 as shown in FIG. 2 over and above that required for the carrier-to-noise measurements. A fixed, tuned preselector 46 is switched into the input cross-modulation RF path via switches 47A, 47B when the triple-beat measurement is to be made, and a transmission gate 50 is situated in the pre-video IF signal path. The transmission gate 50 is controlled by a gate control circuit 49 having the output of the trigger circuit 22 as an input. The preselector 46 is required because generally the spectrum analyzer 10 generates greater triple beat products than are present in the input signal if the broadband CATV signal is applied directly to its input.

The IF gate 50 is required because, if the input signal starts at full amplitude, the IF filter takes too long to decay when it is removed. If the IF channel is turned on just after the picture carrier is moved, as far as the IF channel is concerned it is responding to a carrier that has suddenly been turned on 125 kHz away from its center frequency producing a transient that rapidly increases in amplitude and then more gradually decays out. It requires almost three horizontal lines for the decay to progress so that the triple-beat may be measured.

A unit is needed at the headend to perform the composite triple beat measurement. Merely removing the carrier produces a loud buzz on the viewer's television receiver. This buzz is caused by the so-called intercarrier sound system used in the television receivers. Instead of amplifying the sound carrier separately, the sound carrier is passed through the IF amplifier intended for the picture carrier, but at a fairly low level. At the detector of the receiver the 4.5 MHz picture-sound difference, or intercarrier, signal is picked off, amplified and FM detected to provide the sound output for the TV receiver. Thus if the picture carrier is removed for a short period, the 4.5 MHz intercarrier signal also vanishes, causing the buzz. To avoid or minimize this problem according to the present invention the picture carrier is not removed, but its modulation is removed and its carrier frequency is moved about 125 kHz lower in frequency during the measurement period to remove the spectral clutter in the area where the picture carrier was. To avoid the buzz the exact intercarrier frequency and phase between the picture and sound carriers are maintained by moving the sound carrier frequency by exactly the same amount.

Figure 4:
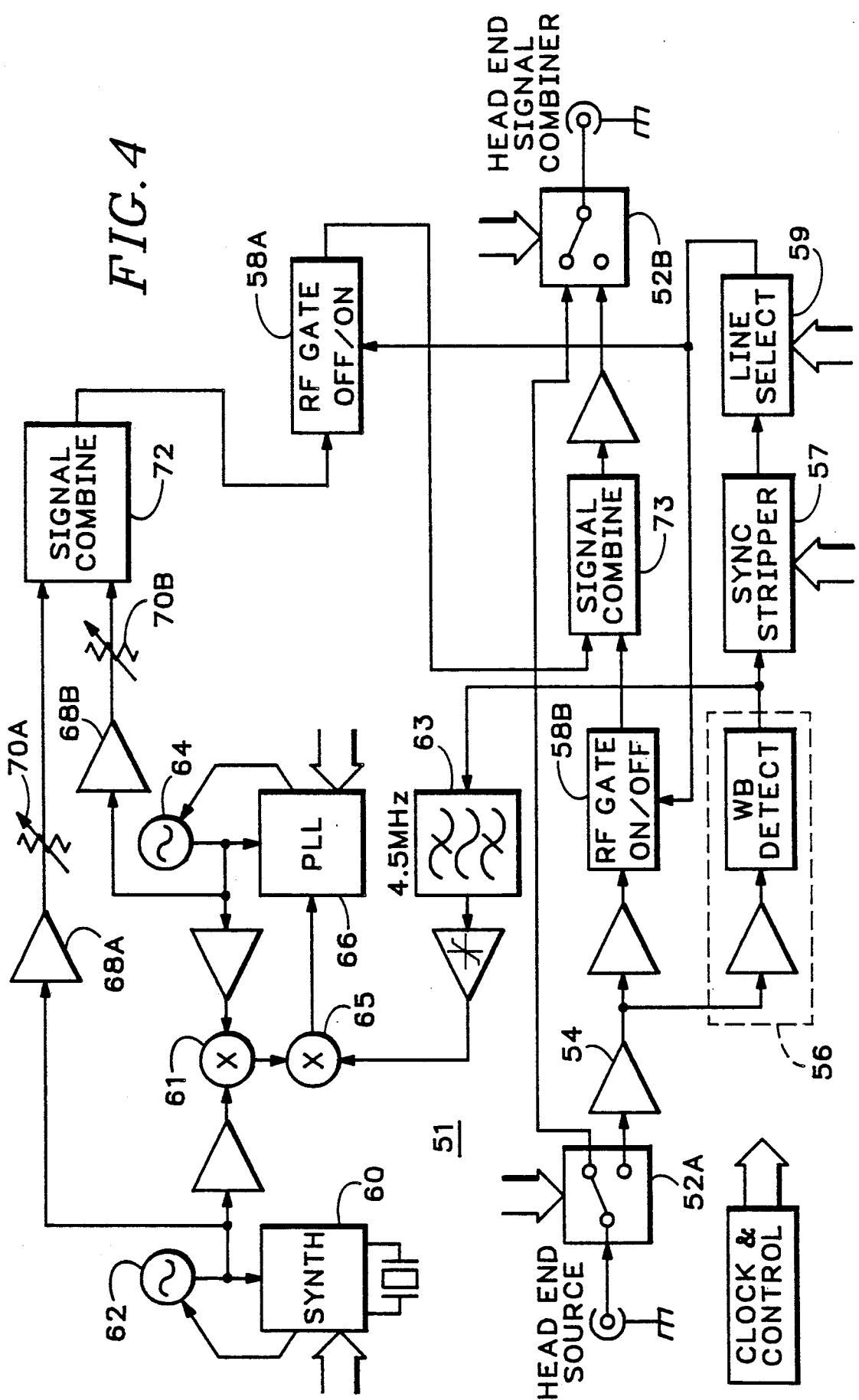
FIG. 4 is a block diagram of a headend unit for performing in-service CATV measurements according to the present invention.

FIG. 4 shows a headend unit 51 that is coupled between a CATV signal source, such as a modulator or off-air signal processor, and a CATV signal combiner. A pair of fail-safe relays 52A, 52B route the input signal from the source to the output of the headend unit 51 if the headend unit is turned off or its power fails. After the input signal is amplified by a buffer amplifier 54, it is input to a broadband detector 56 to recover the intercarrier signal from the input signal and the sync signal from a subsequent sync stripper 57. The sync signal is used to time via line select circuit 59 a gate 58A for the frequency moved carrier signal into the output for three lines within the vertical interval.

Two voltage controlled oscillators with associated control loops are provided. The operator selects the channel to be measured via a front panel switch. The front panel switch controls a single chip synthesizer 60 of the first VCO 62 to position it 125 kHz below the selected channel's carrier frequency. This VCO 62 is used as the frequency moved carrier signal. The second VCO 64 provides a frequency moved sound signal. To assure the correct frequency for the frequency moved sound signal, the difference frequency between it and the frequency moved carrier frequency derived from a mixer 61 is set equal to the intercarrier signal frequency from the wideband detector 56 via a bandpass filter 63 with a phaselock loop 66. A second mixer 65 receives the difference frequency and the intercarrier frequency to generate a control signal for the PLL 66. The lock logic unit uses the same single chip synthesizer 60 to assure that the oscillator 64 is locked on the correct, i.e., high, side of the carrier frequency.

The two frequency moved signals are amplitude adjusted by output buffer amplifiers 68A, 68B and attenuators 70A, 70B, respectively, and combined by a signal combiner 72. The combined signal is gated by the RF gate 58A, 58B for input to a signal combiner 73 together with the outgoing RF signal for three horizontal lines in the vertical interval of the television signal. The particular lines are selected by the operator to avoid conflicts with other vertical interval signals that may be present. If the gate 58A, 58B opens just after the horizontal sync of the first selected line and closes just before the fourth successive line's sync, there is minimum disturbance to the TV receiver's horizontal sync. The amplitude of the frequency moved sound signal should be the same as the amplitude of the signal source's sound signal, but the frequency moved carrier signal need not be at full sync-tip amplitude, and may be about 6 dB below sync tip.

Figure 5:
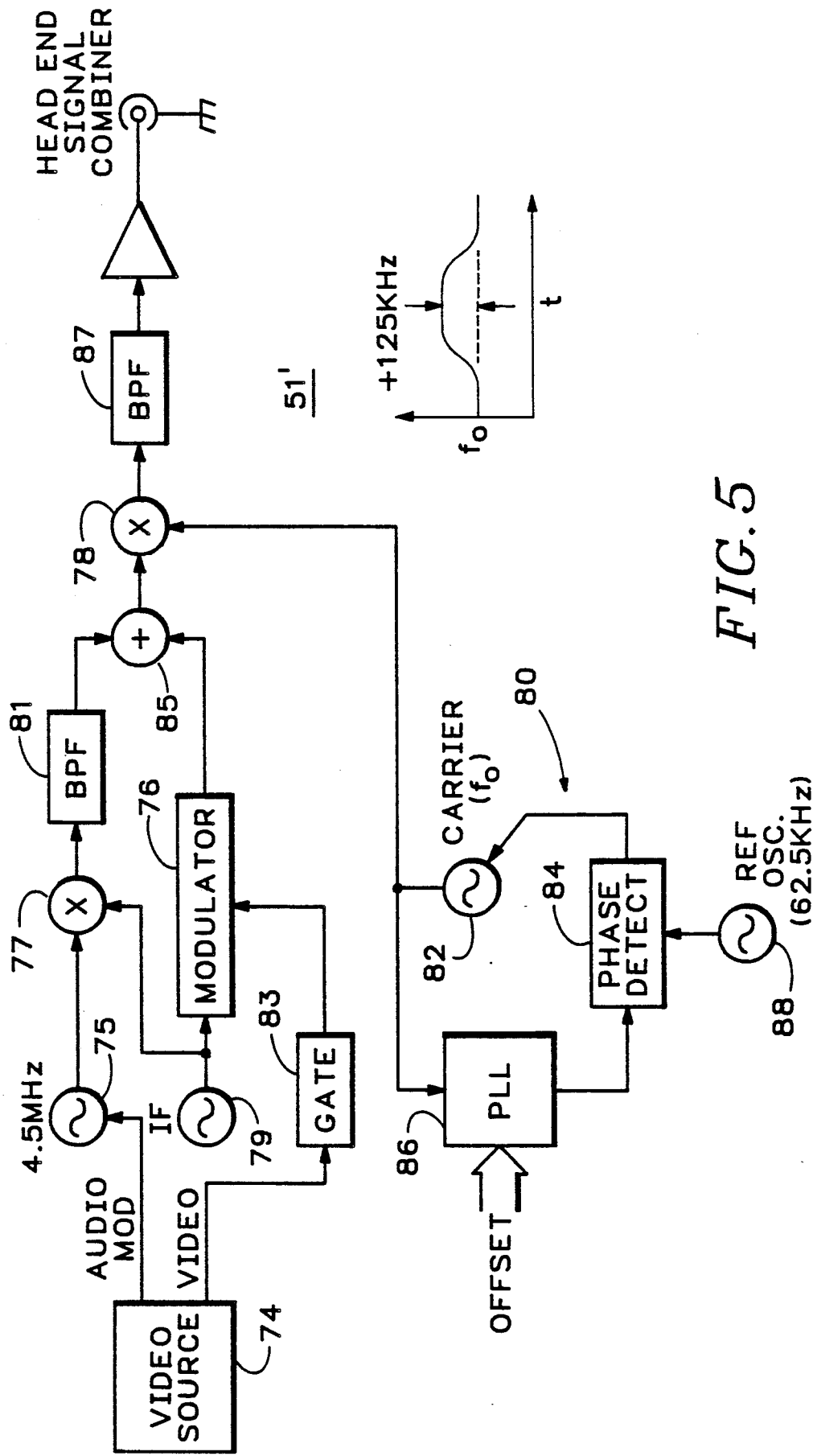
FIG. 5 is a block diagram of an alternate embodiment of a headend unit for performing in-service CATV measurements according to the present invention.

In an alternative embodiment for the headend unit 51', as shown in FIG. 5, a signal source 74 for a single channel provides a video component signal and an audio modulation signal. The audio modulation signal modulates an intercarrier frequency oscillator 75, the output of which is input to a mixer 77 together with an IF frequency from an IF oscillator 79. The output of the mixer 77 is input to a bandpass filter 81 to provide the sound signal. The video signal is input via a gate 83 to a modulator 76 to modulate the IF frequency from the oscillator 79 to provide the video signal. The video and audio signals are input to a combiner 85 and then to an output mixer 78 for modulating the channel carrier frequency. The resulting channel of video and audio is input to a bandpass filter 87 and amplified for distribution. A carrier frequency phase lock loop 80 has a carrier VCO 82 that is controlled by the output of a phase detector 84. An offset signal is input to a phase lock loop logic circuit 86 and the output of the PLL is input to the phase detector 84 for comparison with a reference oscillator 88 having a frequency equal to half the offset frequency. As shown in the inset to FIG. 5 the carrier frequency is offset by 125 kHz during a triple beat measurement.

Figure 6:
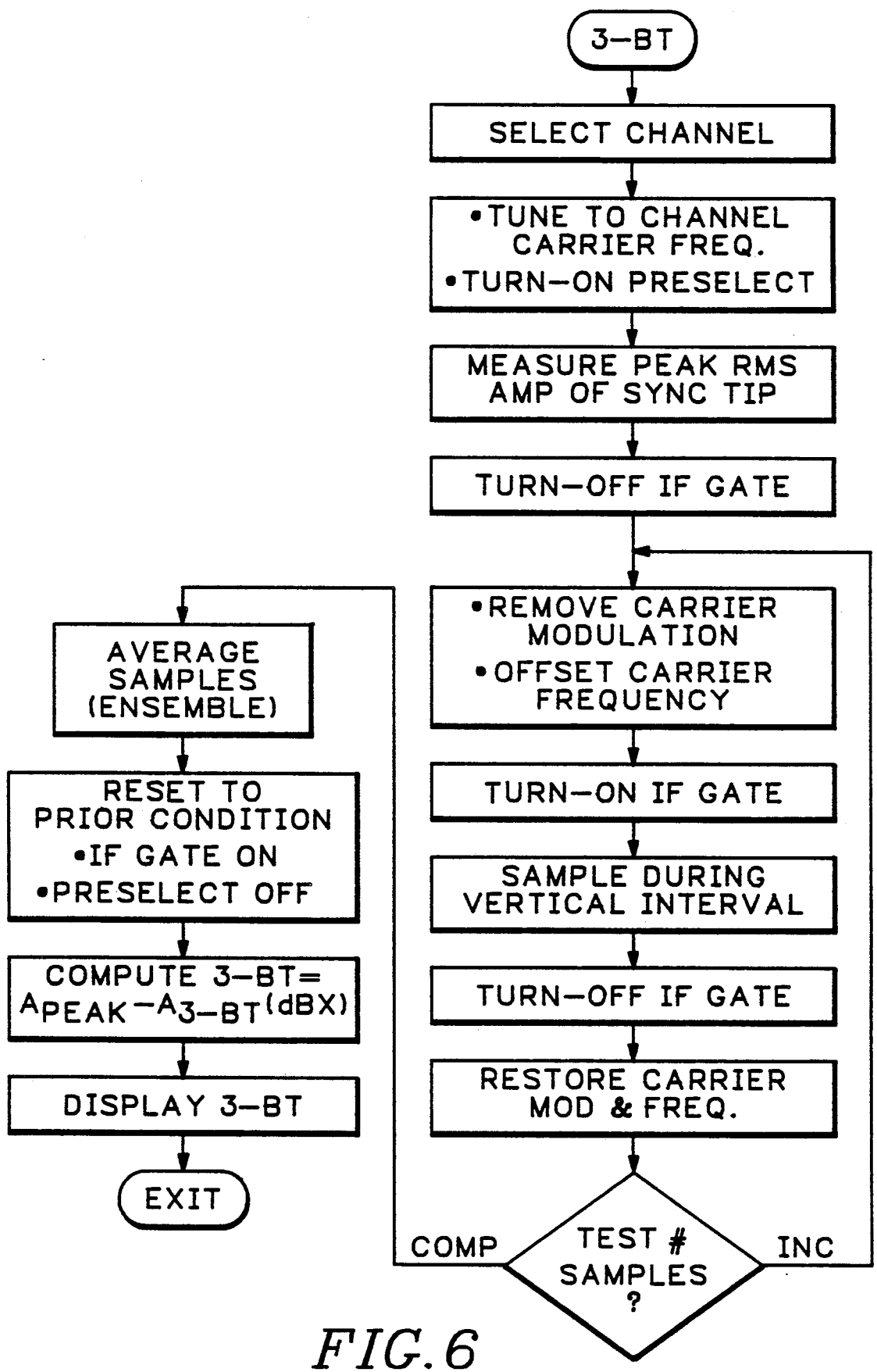
FIG. 6 is a flow chart of the method of measuring composite triple beat ratio according to the present invention.

In operation as shown in FIG. 6 the operator selects the triple beat measurement mode and specifies the channel to be used for the measurement, if applicable. The spectrum analyzer 10 moves to the selected channel and turns on the preselector 46. The signal's peak sync-tip amplitude is measured using a 300 kHz or wider resolution bandwidth filter in the variable BW IF stage 16. The spectrum analyzer 10 then is adjusted for the triple beat measurement by tuning to the carrier frequency of the specified channel in the zero span mode with a resolution bandwidth of 30 kHz and turning on the preselector 46. The IF gate 50 is turned off and the carrier modulation is removed at the head-end and the carrier frequency also is offset. Then the IF gate is turned on and samples are taken for a limited number of lines during the vertical interval, approximately 2½+ lines. The IF gate is then turned off again and the headend restores the carrier frequency and modulation. This cycle is repeated for successive video fields until a sufficient number of samples have been obtained. The samples are ensemble averaged and the analyzer 10 is restored to its original conditions with the preselector off and the IF gate on. An averaged sample at the end of the 2½+ lines of samples is selected as the triple beat noise sample by scanning the display information to find first one impulse caused by turning on the IF gate 50, and then the impulse caused by turning off the IF gate. The amplitude just before the off impulse is taken as the triple beat amplitude. The triple beat ratio is calculated as being the difference in dBx between the sync's peak amplitude and the measured triple beat amplitude. The calculated triple beat ratio is displayed suitably on the display 28.

Thus the present invention provides an apparatus and method for in-service cable television measurements of carrier-to-noise and composite triple beat ratios by performing ensemble averaging in a zero span mode when triggered during the vertical interval of an input video signal, with the carrier-to-noise ratio being determined from averaged data at a fixed point each horizontal line and the triple beat ratio being determined at the end of a three line interval after the carrier frequency is offset by a small frequency increment with the video modulation turned off.

What is claimed is:

1. An apparatus of the type for performing measurements in the frequency domain including means for displaying a frequency spectrum and means for tuning to a desired frequency within the frequency spectrum, the apparatus comprising:

means for generating for the desired frequency a final intermediate frequency signal from an input radio frequency composite television signal having a channel carrier frequency;

means for detecting from the final intermediate frequency signal a composite video signal;

means for generating from the composite video signal a trigger signal for triggering the displaying means during an unmodulated portion of the composite video signal;

means for sampling the composite video signal when the desired frequency is offset from the channel carrier frequency to obtain an average of the amplitude of the composite video signal between sync pulses during the unmodulation portion; and means for computing from a peak amplitude of the sync pulses, determined when the desired frequency is the channel carrier frequency, and the average of a point midway between two sync pulses within the unmodulated portion a carrier-to-noise ratio for the carrier frequency.

2. An apparatus as recited in claim 1 further comprising:

means for prefiltering the input radio frequency composite television signal to provide a prefiltered signal for input to the final intermediate frequency generating means; and means for gating the final intermediate frequency for processing during a specified number of lines within the unmodulated portion.

3. An apparatus as recited in claim 2 further comprising means at the source of the input radio frequency composite television signal for offsetting the channel carrier frequency by a small amount during the specified number of lines.

4. A method of measuring carrier to noise ratio of a composite radio frequency television signal using a frequency domain instrument comprising the steps of:

tuning the frequency domain instrument to a specific channel carrier frequency from among a plurality of channel carrier frequencies contained within the composite radio frequency television signal;

measuring with the frequency domain instrument the specific channel carrier frequency and a peak amplitude of the sync pulses for a composite video signal from the specific channel carrier frequency;

offsetting the frequency domain instrument from the specific channel carrier frequency;

sampling the composite video signal during the unmodulated portion to obtain an average of the amplitude between sync pulses; and computing the carrier-to-noise ratio for the channel carrier frequency as a function of the peak amplitude of the sync pulses and of the average for a sample point midway between two sync pulses.

5. A method of measuring a composite triple beat ratio for a cable television system of the type having a headend unit and a distribution system comprising the steps of:

measuring a peak amplitude of sync tips for a selected channel on the distribution system using a frequency domain instrument ;

offsetting at the headend unit the carrier frequency of the selected channel by a predetermined amount during specified lines of the composite video signal of the selected channel that have no modulation;

sampling the selected channel during the specified lines to obtain an average of the amplitude of the composite video signal;

measuring the amplitude of the average for a sample point at the end of the specified lines;

computing the composite triple beat ratio as a function of the peak amplitude of the sync tips and of the average of the sample point.

6. A headend unit for a cable television system of the type having a plurality of video channels, each channel having a unique carrier frequency, comprises:

means for offsetting the carrier frequency of a selected one of the video channels by a specified amount, maintaining the intercarrier frequency between audio and video portions of the selected video channel constant; and means for combining the offset carrier frequency with the selected one of the video channels such that during a specified number of lines during an unmodulated portion of the selected video channel the offset carrier frequency is substituted for the video channel.

7. A headend unit for a cable television system of the type having a plurality of video channels, each channel having a unique carrier frequency, comprises:

means for modulating a selected carrier frequency with a composite video signal to produce one of the video channels; and means for offsetting the frequency of the selected carrier frequency by a specified amount upon command.

8. An apparatus for performing measurements on a cable television system of the type having a headend for generating a radio frequency composite television signal having a plurality of channels, each channel having a unique carrier frequency, and having a distribution system for carrying the radio frequency composite television signal to a receiver, the apparatus comprising:

a headend unit coupled between a television signal source and a combiner in the headend for offsetting upon command the carrier frequency of a selected one of the channels a predetermined amount during specified television lines during an unmodulated portion of the selected channel; and a frequency domain instrument coupled to the distribution system for measuring the carrier frequency of the selected channel, for determining a peak sync tip amplitude for the selected channel when tuned to the carrier frequency, for determining at a frequency of the frequency domain instrument offset from the carrier frequency a noise amplitude between two sync tips within an unmodulated portion of the selected channel, for determining a triple beat amplitude at the end of the specified television lines when the headend unit is commanded to offset the carrier frequency of the selected channel a small amount, and for calculating from the peak sync tip amplitude, the noise amplitude and the triple beat amplitude a carrier-to-noise ratio and a triple beat ratio for the cable television system.

9. An apparatus as recited in claim 8 wherein the headend unit comprises:

means for offsetting the carrier frequency of the selected channel by the small amount while maintaining constant the intercarrier frequency between audio and video components of the selected channel; and means for combining the selected channel with the offset carrier frequency so that the offset carrier frequency is substituted for the selected channel during the selected lines.

10. An apparatus as recited in claim 8 wherein the headend unit comprises:

means for modulating the carrier frequency of the selected channel with a video signal the intercarrier frequency with an audio signal;

means for combining the modulated audio and video signals; and means for offsetting the carrier and intermodulation frequencies by the small amount during the selected lines.

11. An apparatus as recited in claim 8 wherein the frequency domain instrument comprises:

means for tuning the frequency domain instrument to the carrier frequency of the selected channel;

means for measuring the carrier frequency and a peak amplitude of the sync pulses from the selected channel;

means for offsetting the frequency to which the frequency domain instrument is tuned for the selected channel;

means for sampling the selected channel during the unmodulated portion to obtain an average of the amplitude between sync pulses; and means for computing the carrier-to-noise ratio for the selected channel as a function of the peak amplitude of the sync pulses and the average amplitude of a sample point midway between two sync points.

12. An apparatus as recited in claim 8 wherein the frequency domain instrument comprises:

means for tuning the frequency domain instrument to the carrier frequency of the selected channel;

means for measuring the carrier frequency and a peak amplitude of the sync pulses from the selected channel;

means for sampling the selected channel during the selected lines of the unmodulated portion when the carrier frequency is offset by the small amount to obtain an average amplitude between sync pulses;

means for selecting the amplitude of a sample value near the end of the selected lines as the triple beat amplitude; and means for computing the triple beat ratio as a function of the peak amplitude of the sync tips and of the triple beat amplitude.

* * * * *